US012613692B1

(12) United States Patent
Tuplur et al.

(10) Patent No.: US 12,613,692 B1
(45) Date of Patent: Apr. 28, 2026

(54) TRANSFORMER UTILITY OF A NETWORK DEVICE MANAGEMENT SYSTEM TO FACILITATE AN IN-SERVICE SOFTWARE UPGRADE PROCEDURE

(71) Applicant: Juniper Networks, Inc., Sunnyvale, CA (US)

(72) Inventors: Raj Tuplur, Cupertino, CA (US); Ramesh Rajan, San Jose, CA (US); Vijay Paul, San Jose, CA (US); Aleksey Yurlevich Romanov, Sutton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 271 days.

(21) Appl. No.: 18/606,550

(22) Filed: Mar. 15, 2024

(51) Int. Cl.
*G06F 8/65* (2018.01)

(52) U.S. Cl.
CPC ..................................... *G06F 8/65* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 8,943,489 B1 * | 1/2015 | Qu | G06F 8/656 |
| | | | 717/172 |
| 2004/0255183 A1 * | 12/2004 | Takahashi | G06F 11/1484 |
| | | | 714/E11.137 |
| 2019/0303460 A1 | 10/2019 | Barbarek et al. | |
| 2021/0406216 A1 * | 12/2021 | Komatsu | G06F 16/11 |
| 2022/0094614 A1 * | 3/2022 | Khurshid | H04L 41/147 |
| 2024/0311337 A1 * | 9/2024 | Chen | G06F 16/128 |

* cited by examiner

*Primary Examiner* — Jae U Jeon

(74) *Attorney, Agent, or Firm* — Harrity & Harrity, LLP

(57) ABSTRACT

A network device management may cause initiation of an in-service software upgrade (ISSU) procedure that is associated with an updated state schema and may cause, based on causing the ISSU procedure to be initiated, generation of a current state snapshot of a distributed data store (DDS) that is associated with a current state schema. The network device management may obtain the current state snapshot and may identify one or more objects that conform to the current state schema in the current state snapshot. The network device management system may cause transformation of the one or more objects that conform to the current state schema into one or more objects that conform to the updated state schema and may cause generation of an updated state snapshot associated with the updated state schema. The network device management system may cause an update of the DDS based on the updated state snapshot.

20 Claims, 8 Drawing Sheets

100

100

102
Command to perform
an ISSU procedure
(e.g., that is
associated with an
updated state schema)

Client
Device

Network
Device
Management
System

Network
Devices

100

500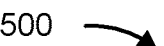

510 — Cause initiation of an in-service software upgrade (ISSU) procedure that is associated with an updated state schema 520 — Cause generation of a current state snapshot of a distributed data source (DDS) that is associated with a current state schema 530 — Obtain the current state snapshot 540 — Identify one or more objects that conform to the current state schema in the current state snapshot 550 — Cause transformation of the one or more objects that conform to the current state schema into one or more objects that conform to the updated state schema 560 — Cause generation of an updated state snapshot associated with the updated state schema 570 — Cause an update of the DDS based on the updated state snapshot

FIG. 5

TRANSFORMER UTILITY OF A NETWORK DEVICE MANAGEMENT SYSTEM TO FACILITATE AN IN-SERVICE SOFTWARE UPGRADE PROCEDURE

BACKGROUND

An in-service software upgrade (ISSU) procedure is a method used to upgrade or update software on a system while minimizing, or preventing, downtime.

SUMMARY

In some implementations, a method includes causing, by a network device management system using an update utility, initiation of an ISSU procedure that is associated with an updated state schema; causing, by the network device management system using the update utility and based on causing the ISSU procedure to be initiated, generation of a current state snapshot of a distributed data store (DDS) that is associated with a current state schema; obtaining, by the network device management system using a transformer utility, the current state snapshot; identifying, by the network device management system using the transformer utility, one or more objects that conform to the current state schema in the current state snapshot; causing, by the network device management system using the transformer utility, transformation of the one or more objects that conform to the current state schema into one or more objects that conform to the updated state schema; causing, by the network device management system using the transformer utility and based on the one or more objects that conform to the updated state schema, generation of an updated state snapshot associated with the updated state schema; and causing, by the network device management system using the update utility, an update of the DDS based on the updated state snapshot.

In some implementations, a non-transitory computer-readable medium storing a set of instructions includes one or more instructions that, when executed by one or more processors of a network device management system, cause the network device management system to: obtain, in association with an ISSU procedure that is associated with an updated state schema, a current state snapshot of a DDS that is associated with a current state schema; identify one or more objects that conform to the current state schema in the current state snapshot; identify information that indicates one or more transformation differences between the current state schema and the updated state schema; cause, based on the information, transformation of the one or more objects that conform to the current state schema into one or more objects that conform to the updated state schema; and cause, based on the one or more objects that conform to the updated state schema, generation of an updated state snapshot associated with the updated state schema.

In some implementations, a network device management system includes one or more memories; and one or more processors to: obtain, in association with an ISSU procedure that is associated with an updated state schema, a current state snapshot that is associated with a current state schema; cause transformation of one or more objects that conform to the current state schema and that are in the current state snapshot into one or more objects that conform to the updated state schema; and cause, based on the one or more objects that conform to the updated state schema, generation of an updated state snapshot associated with the updated state schema.

BRIEF DESCRIPTION OF THE DRAWINGS

FIG. 5 is a flowchart of an example process associated with facilitating an ISSU procedure.

DETAILED DESCRIPTION

Figure 1A:
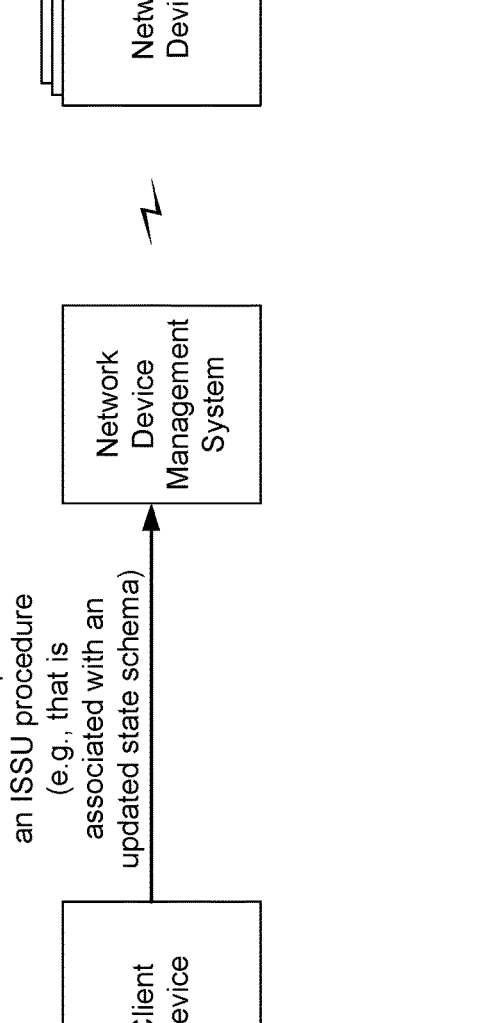
FIGS. 1A-1D are diagrams of an example implementation associated with facilitating an ISSU procedure.

The following detailed description of example implementations refers to the accompanying drawings. The same reference numbers in different drawings may identify the same or similar elements.

During an ISSU procedure, a system is typically updated in a manner that minimizes disruptions to ongoing operations associated with the system. For example, as part of an ISSU procedure to update a network device management system that manages state information for a plurality of network devices, the network device management system may stop all applications associated with the network device management system, may preserve states associated with the network devices that are stored in a distributed data store (DDS) in a state snapshot, may cause network device management system to rebooted, may restore the states to the DDS based on the state snapshot, and may restart the applications. This allows for a quick update of the network device management system and thereby minimizes disruptions to ongoing operations associated with the network device management system.

However, in some cases, such as when the network device management system is updated to support an updated state schema (e.g., that indicates how state information is to be organized, represented, and/or structured within the DDS) that is not compatible with a prior version of the state schema, the network device management system may not perform in an expected manner (e.g., after completion of the ISSU procedure). For example, a bug associated with the prior version of the state schema may persist, even after updating the network device management system to address the bug, because state information associated with the prior version of the state schema still exists in the DDS. As another example, a dependency relationship between particular states may change between the updated state schema and the prior version of the state schema, which may prevent updating and/or retrieving of state information from the DDS and/or may cause the state information to be corrupted.

Some implementations described herein include a network device management system that manages state information for a plurality of network devices. The network device management system includes an update utility to allow the network device management system to initiate an ISSU procedure that is associated with an updated state schema (e.g., to cause a DDS of the network device management system to conform to the updated state schema) and to cause generation of a current state snapshot of the DDS (e.g., that is associated with a current state schema). The network device management system also includes a transformer utility to allow the network device management system to identify one or more objects that conform to the current state schema in the current state snapshot and to cause transformation of the one or more objects that conform to the current state schema into one or more objects that conform to the updated state schema. The transformer utility further allows the network device management system to cause generation of an updated state snapshot associated with the updated state schema. The update utility then allows the network device management system to cause an update of the DDS based on the updated state snapshot.

In this way, the network device management system allows the DDS to be populated with state information that conforms to the updated state schema in association with an ISSU procedure, which is not practically possible today. This improves a performance of the network device management system (e.g., after completion of the ISSU procedure) by reducing a likelihood that DDS issues (e.g., state schema bug persistence issues, state schema dependency structure issues, or other issues) will occur. Accordingly, this conserves computing resources (e.g., processing resources, memory resources, communication resources, and/or power resources, among other examples) that would otherwise be utilized to address DDS issues and minimizes a likelihood of future disruptions associated with the network device management system (e.g., by minimizing a likelihood that the network device management system will need to be offlined to address DDS issues).

FIGS. 1A-1D are diagrams of an example implementation 100 associated with facilitating an ISSU procedure. As shown in FIGS. 1A-1D, example implementation 100 includes a network device management system, a plurality of network devices, and a client device. These devices are described in more detail below in connection with FIGS. 2-4.

The network device management system may be configured to store state information related to the plurality of network devices. For example, the network device management system may include, or may have access to, a DDS that stores state information (e.g., operation states, configuration states, and/or other types of states or related information) associated with each network device of the plurality of network devices. The DDS may be associated with a state schema, which indicates how states are to be organized, represented, and/or structured within the DDS. For example, the DDS may store the state information associated with each network device as one or more objects that conform to the state schema.

As shown in FIG. 1A, and by reference number 102, the network device management system may receive a command, such as from the client device. For example, a user of the client device may interact with a user interface provided by the network device management system (e.g., a command line interface (CLI), a graphical user interface (GUI), or another interface) to enter or otherwise initiate the command, and the client device may send the command to the network device management system. The command may indicate that the network device management system is to be updated via performance of an ISSU procedure. In some implementations, the command may include an instruction for the network device management system to create an update utility (e.g., an update application and/or an update module) that is configured to facilitate updating of the network device management system.

The ISSU procedure may be associated with an updated state schema (e.g., for the DDS). Accordingly, the command may include the updated state schema, or may include an instruction for the network device management system to obtain the updated state schema from another source (e.g., another data source). Accordingly, the network device management system may obtain the updated state schema (e.g., via the command or from the other source).

Figure 1B:
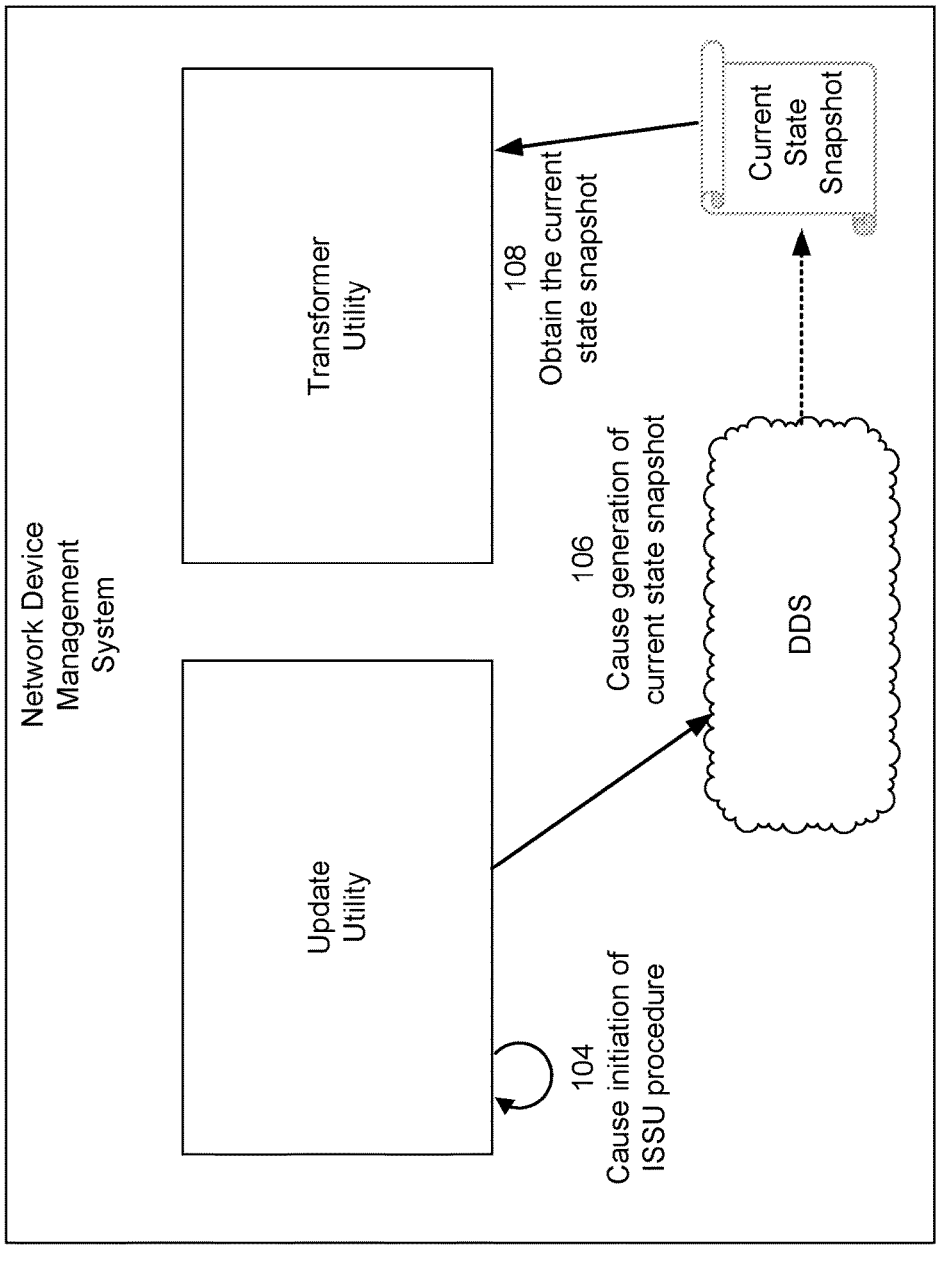

As shown in FIG. 1B, and by reference number 104, the network device management system (e.g., using the update utility) may cause initiation of the ISSU procedure (e.g., based on the network device management system receiving the command). For example, the network device management system may cause applications (e.g., that are included the network device management system) to stop running (e.g., to prevent changes to states of the plurality of network devices) and may cause the DDS to include current state information (e.g., the most current state information) associated with each network device.

As shown by reference number 106, network device management system (e.g., using the update utility) may cause generation of a current state snapshot (e.g., based on the network device management system causing the ISSU procedure to be initiated). For example, the network device management system may cause generation of a current state snapshot of the DDS. The current state snapshot may include current state information associated with each network device that was stored in the DDS. Accordingly, the current state snapshot may be associated with a current state schema (e.g., that indicates how the DDS stored the current state information associated with each network device at the time of generation of the current state snapshot). In some implementations, the current state snapshot may include one or more objects (e.g., that conform to the current state schema).

In some implementations, the network device management system (e.g., using the update utility) may create a transformer utility (e.g., a transformer application and/or a transformer module), which may be configured to facilitate transforming the current state snapshot into an updated state snapshot, as further described herein. The network device management system may create the transformer utility in association with initiating the ISSU procedure.

Accordingly, as shown by reference number 108, the network device management system (e.g., using the transformer utility) may obtain the current state snapshot. For example, the network device management system (e.g., using the transformer utility) may obtain the current state snapshot as result of the network device management system (e.g., using the update utility) causing generation of the current state snapshot.

In some implementations, the network device management system (e.g., using the transformer utility) may cause deserialization of the current state snapshot. For example, the network device management system may cause deserialization of the current state snapshot to enable (or to facilitate) identifying one or more objects in the current state snapshot, as described herein.

Figure 1C:
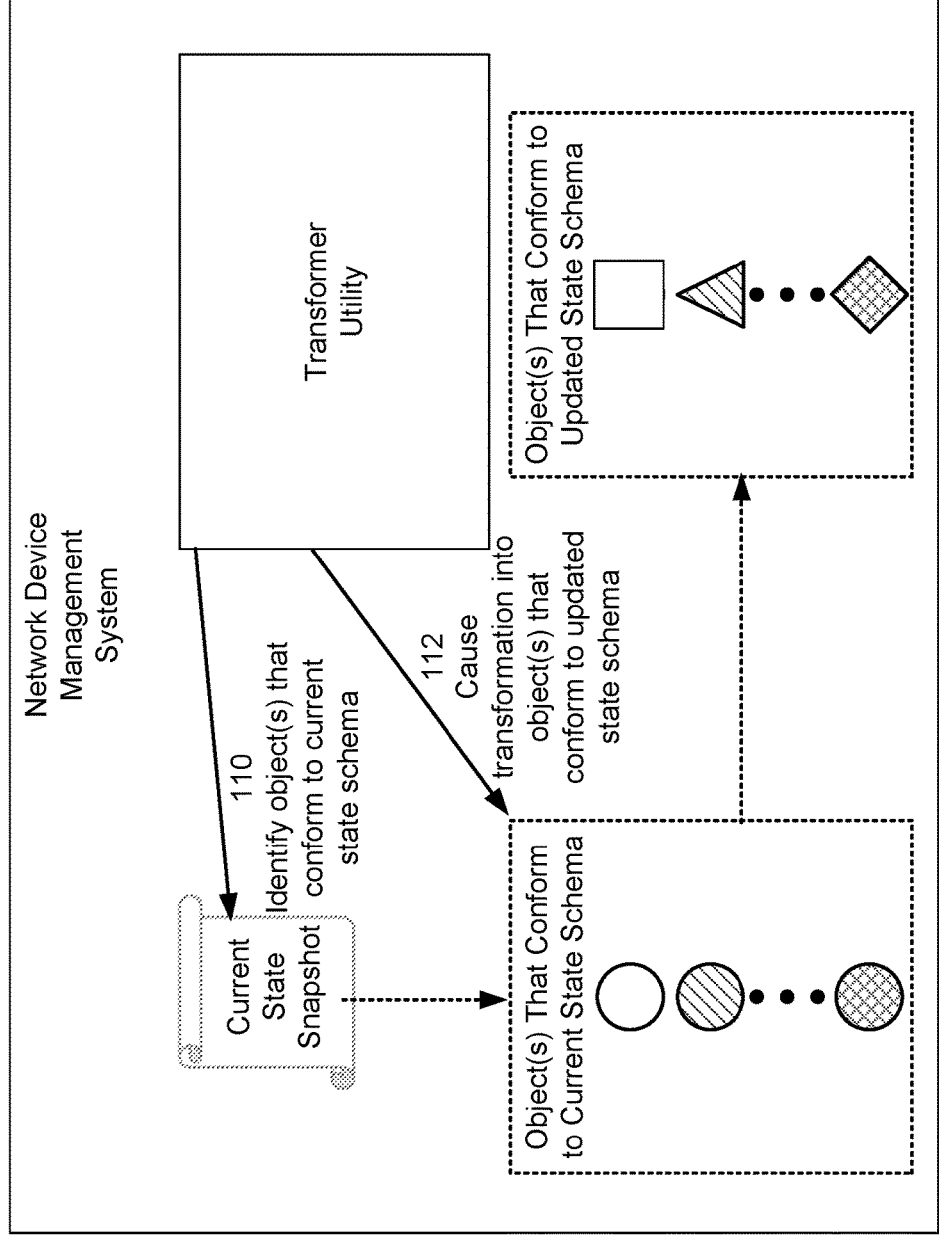

As shown in FIG. 1C, and by reference number 110, the network device management system (e.g., using the transformer utility) may identify one or more objects in the current state snapshot. The network device management system may process (e.g., parse, read, and/or otherwise analyze) the current state snapshot to identify the one or more objects. The one or more objects may conform to the current state schema. For example, as shown in FIG. 1C, the network device management system may identify, when the current state schema structures objects as "circles," one or more circle objects (where each object is shown as a particular circle with a particular shading or patterning).

In some implementations, the network device management system (e.g., using the transformer utility) may preprocess the one or more objects that conform to the current state schema (e.g., before causing transformation of the one or more objects that conform to the current state schema, as described herein). For example, the network device management system may cause the one or more objects that conform to the current state schema to be ordered according to a sequencing scheme. The sequencing scheme may indicate an order in which objects are to be processed to improve a performance and/or an accuracy of a transformation of the objects.

As shown by reference number 112, the network device management system (e.g., using the transformer utility) may cause transformation of the one or more objects that conform to the current state schema into one or more objects that conform to the updated state schema. For example, as shown in FIG. 1C, when the updated state schema structures objects as "polygons," the network device management system may cause the one or more circle objects to be transformed into one or more polygon objects (e.g., where a circle object with no shading is transformed into a square object with no shading, a circle object with left-to-right patterning is transformed into a triangle with left-to-right patterning, and a circle with diamond patterning is transformed into a diamond with diamond patterning). In some implementations, transformation of the one or more objects that conform to the current state schema into one or more objects that conform to the updated state schema includes updating and/or deleting the one or more objects that conform to the current state schema and/or creating new objects that conform to the updated state schema.

In some implementations, the network device management system (e.g., using the transformer utility) may identify information that indicates one or more transformation differences between the current state schema and the updated state schema. For example, the network device management system may obtain first information that indicates one or more first transformations associated with the current state schema (e.g., one or more first transformations as compared to a "baseline" state schema) and may obtain second information that indicates one or more second transformations associated with the updated state schema (e.g., one or more second transformations as compared to the baseline state schema). The network device management system may obtain the first information and/or the second information from another data source, which may be included in the network device management system or may be accessible to the network device management system. Accordingly, the network device management system may determine (e.g., based on the first information and the second information) the one or more transformation differences between the current state schema and the updated state schema. For example, the network device management system may compare the first information and the second information to identify only transformations that are included in the second information and not included in the first information.

Accordingly, the network device management system (e.g., using the transformer utility) may determine (e.g., based on the information that indicates one or more transformation differences between the current state schema and the updated state schema) one or more transformation operations associated with current state schema and the updated state schema (e.g., one or more transformation operations to be performed to cause objects that conform to the current schema to be transformed into objects that conform to the updated state schema).

The network device management system (e.g., using the transformer utility) may therefore cause performance of the one or more transformation operations on the one or more objects that conform to the current state schema. For example, the network device management system may cause performance of the one or more transformation operations on the one or more objects that conform to the current state schema to cause the transformation of the one or more objects that conform to the current state schema into the one or more objects that conform to the updated state schema.

In some implementations, the network device management system (e.g., using the transformer utility) may identify one or more plug-ins associated with the one or more transformation operations (e.g., plug-ins that, when executed, are configured to perform the one or more transformation operations). The network device management system may identify the one or more plug-ins based on plug-in information (e.g., that identifies plug-ins and which transformation operations are associated with the plug-ins). The plug-in information may be obtained from another data source, which may be included in the network device management system or may be accessible to the network device management system. Accordingly, the network device management system (e.g., using the transformer utility) may cause the one or more plug-ins to be loaded and executed, which may cause performance of the one or more transformation operations. In this way, the network device management system may cause the transformation of the one or more objects that conform to the current state schema into the one or more objects that conform to the updated state schema.

Figure 1D:
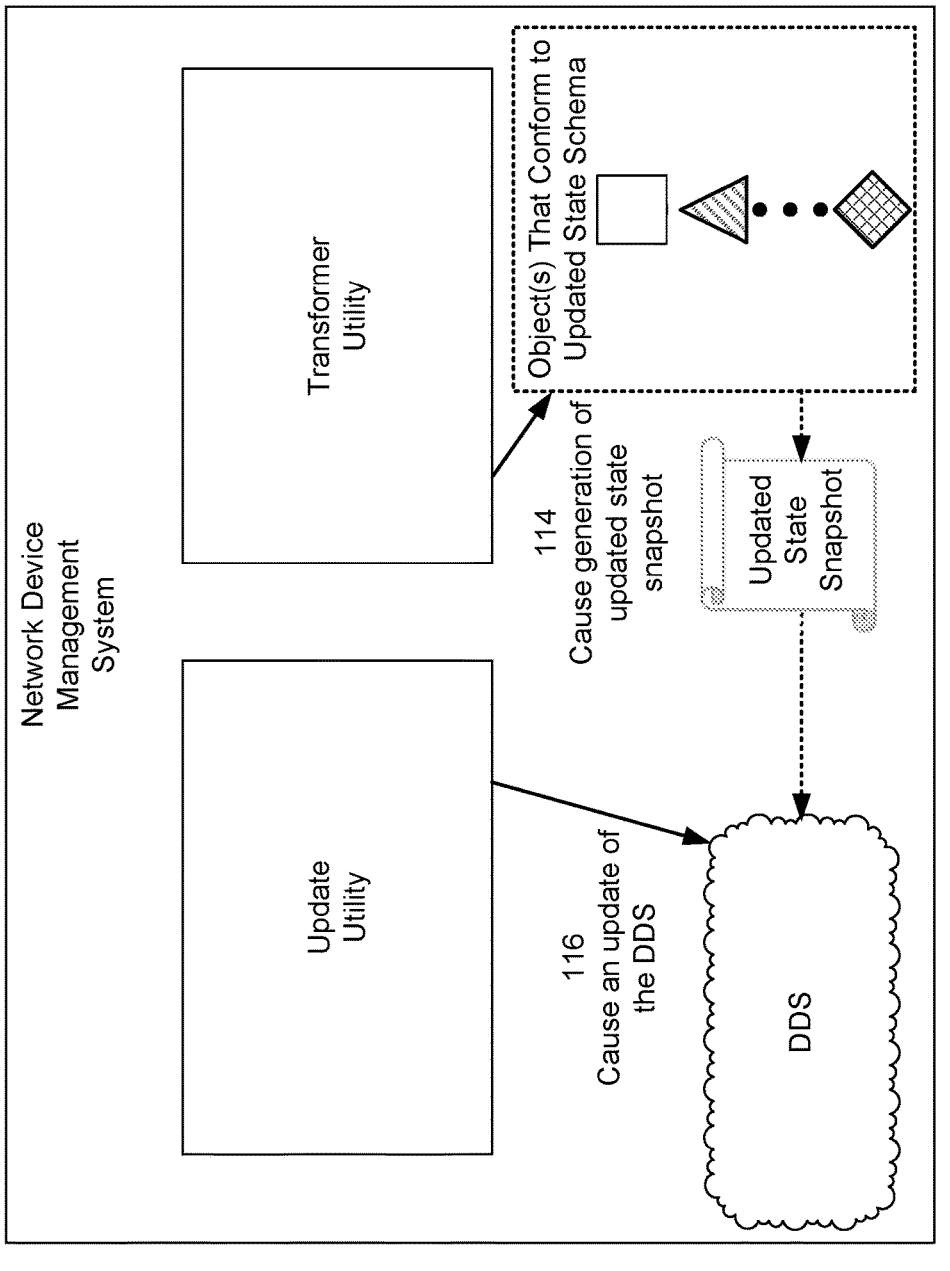

As shown in FIG. 1D, and by reference number 114, the network device management system (e.g., using the transformer utility) may cause generation of an updated state snapshot (e.g., that is associated with the updated state schema). For example, the network device management system may cause the updated state snapshot to be generated to include the one or more objects that conform to the updated state schema. In some implementations, the network device management system (e.g., using the transformer utility) may cause serialization of the updated state snapshot. For example, the network device management system may cause serialization of the updated state snapshot to enable (or to facilitate) storage of the updated state snapshot (e.g., in the DDS), as described herein.

As shown by reference number 116, the network device management system (e.g., the update utility) may cause an update of the DDS (e.g., based on the updated state snapshot). For example, the network device management system (e.g., using the update utility) may obtain the updated state snapshot as a result of the network device management system (e.g., using the transformer utility) causing generation of the updated state snapshot, and may store the updated state snapshot in the DDS (e.g., in place of the current state snapshot). In this way, the DDS is updated to allow the ISSU procedure to finish, which enables applications of network device management system to restart and update state information associated with each network device, of the plurality of network devices, according to the updated state schema.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
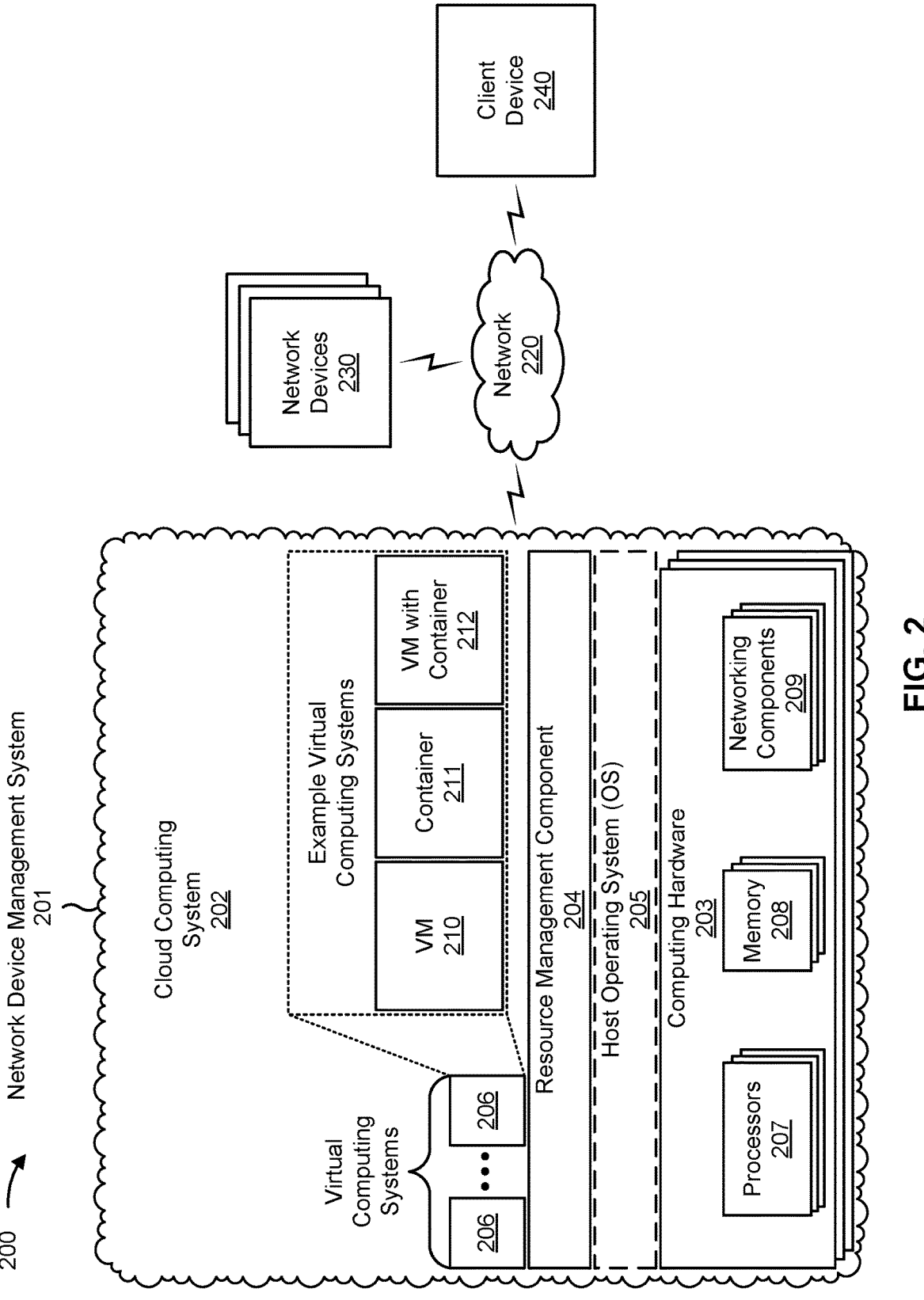
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device management system 201, which may include one or more elements of and/or may execute within a cloud computing system 202. The cloud computing system 202 may include one or more elements 203-212, as described in more detail below. As further shown in FIG. 2, environment 200 may include a network 220, a plurality of network devices 230, and a client device 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network device management system 201 may include one or more elements 203-212 of the cloud computing system 202, may execute within the cloud computing system 202, and/or may be hosted within the cloud computing system 202, in some implementations, the network device management system 201 may not be cloud-based (e.g., may be implemented outside of a cloud computing system) or may be partially cloud-based. For example, the network device management system 201 may include one or more devices that are not part of the cloud computing system 202, such as device 300 of FIG. 3 or device 400 of FIG. 4, which may include a standalone server or another type of computing device. The network device management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 may include one or more devices capable of receiving, processing, storing, routing, and/or providing traffic (e.g., a packet and/or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, a group of network devices 230 may be a group of data center nodes that are used to route traffic flow through a network.

The client device 240 may include one or more devices capable of receiving, generating, storing, processing, and/or providing information, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
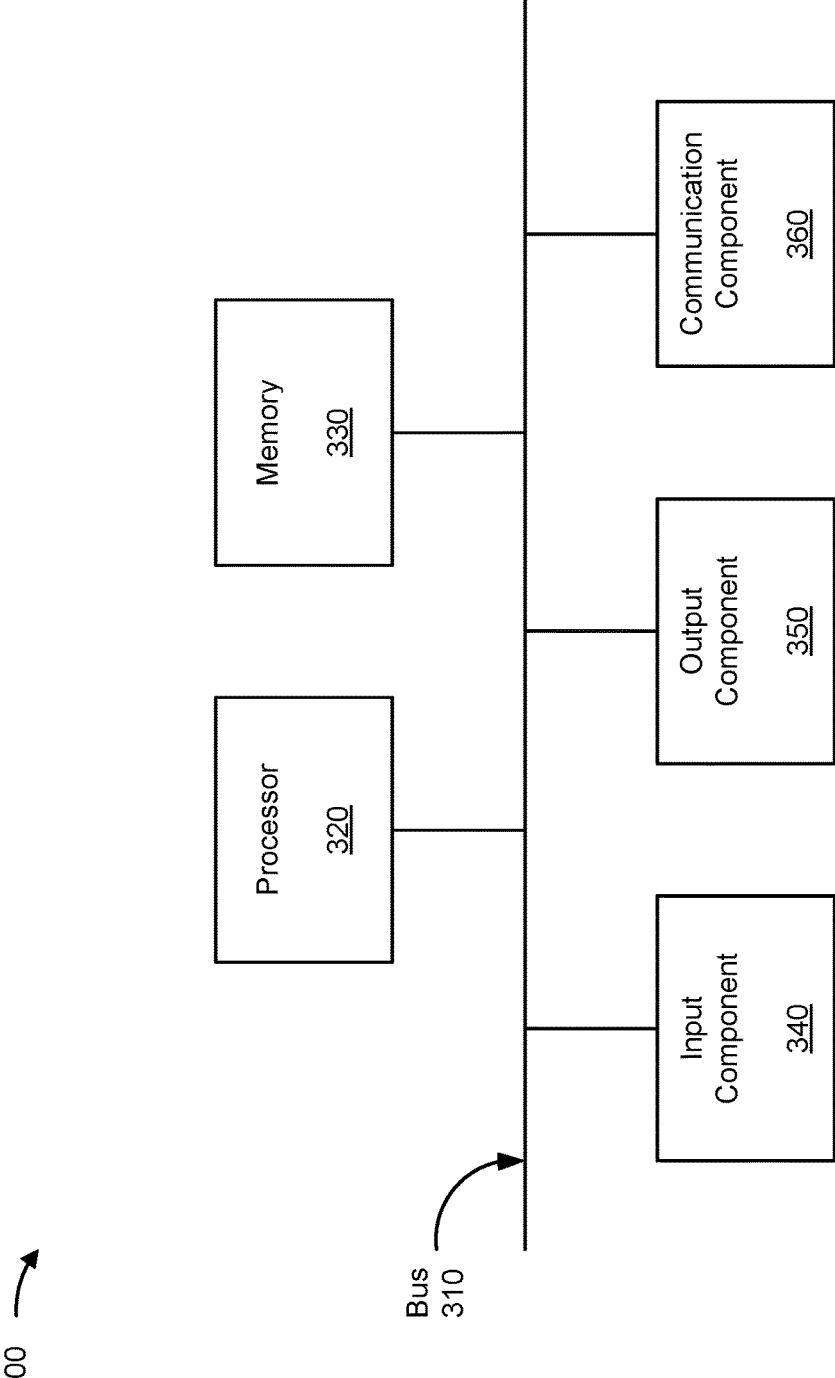
FIG. 3 is a diagram of example components of a device associated with facilitating an ISSU procedure.

FIG. 3 is a diagram of example components of a device 300 associated with facilitating an ISSU procedure. The device 300 may correspond to network device management system 201, computing hardware 203, network device 230, and/or client device 240. In some implementations, network device management system 201, computing hardware 203, network device 230, and/or client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
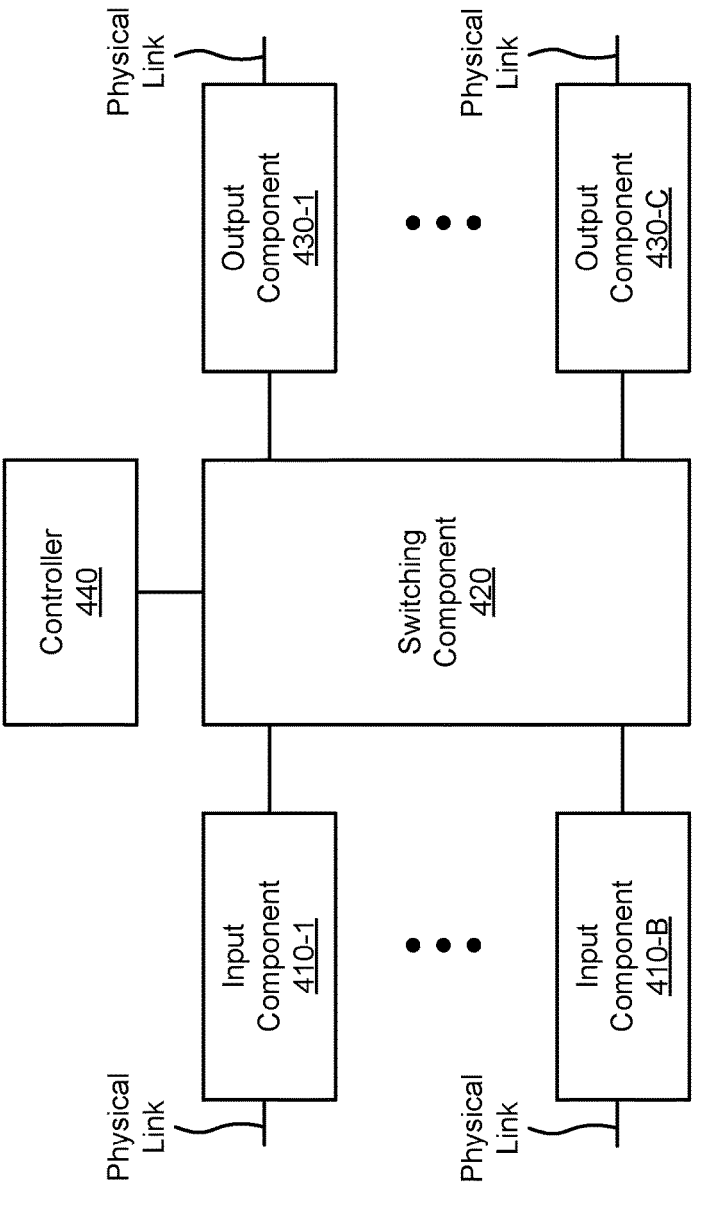
FIG. 4 is a diagram of example components of a device associated with facilitating an ISSU procedure.

FIG. 4 is a diagram of example components of a device 400 associated with facilitating an ISSU procedure. Device 400 may correspond to network device management system 201, computing hardware 203, network device 230, and/or client device 240. In some implementations, network device management system 201, computing hardware 203, network device 230, and/or client device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with facilitating an ISSU procedure. In some implementations, one or more process blocks of FIG. 5 are performed by a network device management system (e.g., network device management system 201). In some implementations, one or more process blocks of FIG. 5 are performed by another device or a group of devices separate from or including the network device management system, such as computing hardware (e.g., computing hardware 203), a network device (e.g., network device 230) and/or a client device (e.g., client device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include causing initiation of an ISSU procedure that is associated with an updated state schema (block 510). For example, the network device management system (e.g., using an update utility) may cause initiation of an in-service software upgrade (ISSU) procedure that is associated with an updated state schema, as described above.

As further shown in FIG. 5, process 500 may include causing generation of a current state snapshot of a DDS that is associated with a current state schema (block 520). For example, the network device management system (e.g., using the update utility) may cause generation of a current state snapshot of a DDS that is associated with a current state schema, as described above.

As further shown in FIG. 5, process 500 may include obtaining the current state snapshot (block 530). For example, the network device management system (e.g., using a transformer utility) may obtain the current state snapshot, as described above.

As further shown in FIG. 5, process 500 may include identifying one or more objects that conform to the current state schema in the current state snapshot (block 540). For example, the network device management system (e.g., using the transformer utility) may identify one or more objects that conform to the current state schema in the current state snapshot, as described above.

As further shown in FIG. 5, process 500 may include causing transformation of the one or more objects that conform to the current state schema into one or more objects that conform to the updated state schema (block 550). For example, the network device management system (e.g., using the transformer utility) may cause transformation of the one or more objects that conform to the current state schema into one or more objects that conform to the updated state schema, as described above.

As further shown in FIG. 5, process 500 may include causing generation of an updated state snapshot associated with the updated state schema (block 560). For example, the network device management system (e.g., using the transformer utility) may cause generation of an updated state snapshot associated with the updated state schema, as described above.

As further shown in FIG. 5, process 500 may include causing an update of the DDS based on the updated state snapshot (block 570). For example, the network device management system (e.g., using the update utility) may cause an update of the DDS based on the updated state snapshot, as described above.

Process 500 may include additional implementations, such as any single implementation or any combination of implementations described below and/or in connection with one or more other processes described elsewhere herein.

In a first implementation, causing the transformation of the one or more objects that conform to the current state schema into the one or more objects that conform to the updated state schema comprises identifying information that indicates one or more transformation differences between the current state schema and the updated state schema; determining, based on the information, one or more transformation operations associated with the current state schema and the updated state schema; and causing performance of the one or more transformation operations on the one or more objects that conform to the current state schema to cause the transformation of the one or more objects that conform to the current state schema into the one or more objects that conform to the updated state schema.

In a second implementation, alone or in combination with the first implementation, identifying the information that indicates the one or more transformation differences between the current state schema and the updated state schema comprises obtaining first information that indicates one or more first transformations associated with the current state schema; obtaining second information that indicates one or more second transformations associated with the updated state schema; and determining, based on the first information and the second information, the one or more transformation differences between the current state schema and the updated state schema.

In a third implementation, alone or in combination with one or more of the first and second implementations, causing the performance of the one or more transformation operations comprises identifying one or more plug-ins associated with the one or more transformation operations, and causing the one or more plug-ins to be loaded and executed to cause performance of the one or more transformation operations.

In a fourth implementation, alone or in combination with one or more of the first through third implementations, process 500 includes causing, by the network device management system (e.g., using the transformer utility) and prior to causing the transformation of the one or more objects that conform to the current state schema, the one or more objects that conform to the current state schema to be ordered according to a sequencing scheme.

In a fifth implementation, alone or in combination with one or more of the first through fourth implementations, process 500 includes causing, by the network device management system (e.g., using the transformer utility) and prior to identifying the one or more objects that conform to the current state schema in the current state snapshot, deserialization of the current state snapshot.

In a sixth implementation, alone or in combination with one or more of the first through fifth implementations, process 500 includes causing, by the network device management system (e.g., using the transformer utility) and prior to causing the update of the DDS based on the updated state snapshot, serialization of the updated state snapshot.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
causing, by a network device management system using an update utility, initiation of an in-service software upgrade (ISSU) procedure that is associated with an updated state schema;
causing, by the network device management system using the update utility and based on causing the ISSU procedure to be initiated, generation of a current state snapshot of a distributed data store (DDS) that is associated with a current state schema;
obtaining, by the network device management system using a transformer utility, the current state snapshot;
identifying, by the network device management system using the transformer utility, one or more objects that conform to the current state schema in the current state snapshot;
causing, by the network device management system using the transformer utility, transformation of the one or more objects that conform to the current state schema into one or more objects that conform to the updated state schema;
causing, by the network device management system using the transformer utility and based on the one or more objects that conform to the updated state schema, generation of an updated state snapshot associated with the updated state schema; and
causing, by the network device management system using the update utility, an update of the DDS based on the updated state snapshot.

2. The method of claim 1, wherein causing the transformation of the one or more objects that conform to the current state schema into the one or more objects that conform to the updated state schema comprises:
identifying, by the network device management system using the transformer utility, information that indicates one or more transformation differences between the current state schema and the updated state schema;
determining, by the network device management system using the transformer utility and based on the information, one or more transformation operations associated with the current state schema and the updated state schema; and
causing, by the network device management system using the transformer utility, performance of the one or more transformation operations on the one or more objects that conform to the current state schema to cause the transformation of the one or more objects that conform to the current state schema into the one or more objects that conform to the updated state schema.

3. The method of claim 2, wherein identifying the information that indicates the one or more transformation differences between the current state schema and the updated state schema comprises:
obtaining, by the network device management system using the transformer utility, first information that indicates one or more first transformations associated with the current state schema;
obtaining, by the network device management system using the transformer utility, second information that indicates one or more second transformations associated with the updated state schema; and
determining, by the network device management system using the transformer utility and based on the first information and the second information, the one or more transformation differences between the current state schema and the updated state schema.

4. The method of claim 2, wherein causing the performance of the one or more transformation operations comprises:
identifying, by the network device management system using the transformer utility, one or more plug-ins associated with the one or more transformation operations; and
causing, by the network device management system using the transformer utility, the one or more plug-ins to be loaded and executed to cause performance of the one or more transformation operations.

5. The method of claim 1, further comprising:
causing, by the network device management system using the transformer utility and prior to causing the transformation of the one or more objects that conform to the current state schema, the one or more objects that conform to the current state schema to be ordered according to a sequencing scheme.

6. The method of claim 1, further comprising:
causing, by the network device management system using the transformer utility and prior to identifying the one or more objects that conform to the current state schema in the current state snapshot, deserialization of the current state snapshot.

7. The method of claim 1, further comprising:
causing, by the network device management system using the transformer utility and prior to causing the update of the DDS based on the updated state snapshot, serialization of the updated state snapshot.

8. A non-transitory computer-readable medium storing a set of instructions, the set of instructions comprising:
one or more instructions that, when executed by one or more processors of a network device management system, cause the network device management system to:
obtain, in association with an in-service software upgrade (ISSU) procedure that is associated with an updated state schema, a current state snapshot of a distributed data store (DDS) that is associated with a current state schema;
identify one or more objects that conform to the current state schema in the current state snapshot;
identify information that indicates one or more transformation differences between the current state schema and the updated state schema;
cause, based on the information, transformation of the one or more objects that conform to the current state schema into one or more objects that conform to the updated state schema; and cause, based on the one or more objects that conform to the updated state schema, generation of an updated state snapshot associated with the updated state schema.

9. The non-transitory computer-readable medium of claim 8, wherein the one or more instructions, that cause the network device management system to identify the information that indicates the one or more transformation differences between the current state schema and the updated state schema, cause the network device management system to:

obtain first information that indicates one or more first transformations associated with the current state schema;

obtain second information that indicates one or more second transformations associated with the updated state schema; and determine, based on the first information and the second information, the one or more transformation differences between the current state schema and the updated state schema.

10. The non-transitory computer-readable medium of claim 8, wherein the one or more instructions, that cause the network device management system to cause the transformation of the one or more objects that conform to the current state schema into the one or more objects that conform to the updated state schema, cause the network device management system to:

determine, based on the information, one or more transformation operations associated with the current state schema and the updated state schema; and cause performance of the one or more transformation operations on the one or more objects that conform to the current state schema to cause the transformation of the one or more objects that conform to the current state schema into the one or more objects that conform to the updated state schema.

11. The non-transitory computer-readable medium of claim 10, wherein the one or more instructions, that cause the network device management system to cause the performance of the one or more transformation operations, cause the network device management system to:

identify one or more plug-ins associated with the one or more transformation operations; and cause the one or more plug-ins to be loaded and executed to cause performance of the one or more transformation operations.

12. The non-transitory computer-readable medium of claim 8, wherein the one or more instructions further cause the network device management system to:

cause, prior to causing the transformation of the one or more objects that conform to the current state schema, the one or more objects that conform to the current state schema to be ordered according to a sequencing scheme.

13. The non-transitory computer-readable medium of claim 8, wherein the one or more instructions further cause the network device management system to:

cause, prior to identifying the one or more objects that conform to the current state schema in the current state snapshot, deserialization of the current state snapshot.

14. The non-transitory computer-readable medium of claim 8, wherein the one or more instructions further cause the network device management system to:

cause serialization of the updated state snapshot.

15. A network device management system, comprising:

one or more memories; and one or more processors to:

obtain, in association with an in-service software upgrade (ISSU) procedure that is associated with an updated state schema, a current state snapshot that is associated with a current state schema;

identify one or more objects that conform to the current state schema in the current state snapshot;

identify information that indicates one or more transformation differences between the current state schema and the updated state schema;

cause, based on the information, transformation of one or more objects that conform to the current state schema and that are in the current state snapshot into one or more objects that conform to the updated state schema; and cause, based on the one or more objects that conform to the updated state schema, generation of an updated state snapshot associated with the updated state schema.

16. The network device management system of claim 15, wherein the one or more processors, to cause the transformation of the one or more objects that conform to the current state schema and that are in the current state snapshot into the one or more objects that conform to the updated state schema, are to:

determine, based on information that indicates one or more transformation differences between the current state schema and the updated state schema, one or more transformation operations associated with the current state schema and the updated state schema; and cause performance of the one or more transformation operations on the one or more objects that conform to the current state schema.

17. The network device management system of claim 16, wherein the one or more processors, to cause the performance of the one or more transformation operations, are to:

cause one or more plug-ins that are associated with the one or more transformation operations to be loaded and executed.

18. The network device management system of claim 15, wherein the one or more processors are further to:

cause, prior to causing the transformation of the one or more objects that conform to the current state schema and that are in the current state snapshot into the one or more objects that conform to the updated state schema, the one or more objects that conform to the current state schema to be ordered according to a sequencing scheme.

19. The network device management system of claim 15, wherein the one or more processors are further to:

cause, prior to causing the transformation of the one or more objects that conform to the current state schema and that are in the current state snapshot into the one or more objects that conform to the updated state schema, deserialization of the current state snapshot.

20. The network device management system of claim 15, wherein the one or more processors are further to:

cause serialization of the updated state snapshot.

* * * * *